(12) United States Patent
Liu et al.

(10) Patent No.: US 7,953,067 B2
(45) Date of Patent: May 31, 2011

(54) METHOD, NETWORK APPARATUS, AND TANGIBLE MACHINE-READABLE MEDIUM THEREOF FOR DETECTING A LOOPING NETWORK PACKET

(75) Inventors: Yung-Chih Liu, Taipei (TW); Bing-Huan Shie, Taipei (TW)

(73) Assignee: Institute for Information Industry, Taipei (TW)

( * ) Notice: Subject to any disclaimer, the term of this patent is extended or adjusted under 35 U.S.C. 154(b) by 283 days.

(21) Appl. No.: 11/944,716

(22) Filed: Nov. 26, 2007

(65) Prior Publication Data

US 2008/0304417 A1 Dec. 11, 2008

(30) Foreign Application Priority Data

Jun. 7, 2007 (TW) .............................. 96120588 A

(51) Int. Cl.
H04L 12/28 (2006.01)
(52) U.S. Cl. ..................................................... 370/351
(58) Field of Classification Search .................. 370/310, 370/351, 389, 392, 400; 709/223, 224, 238–246
See application file for complete search history.

(56) References Cited

U.S. PATENT DOCUMENTS

| 7,349,360 B2 * | 3/2008 | Gutierrez et al. | 370/315 |
| 7,428,232 B2 * | 9/2008 | Park et al. | 370/349 |
| 2004/0165532 A1 * | 8/2004 | Poor et al. | 370/238 |
| 2006/0030353 A1 * | 2/2006 | Jun | 455/550.1 |
| 2007/0297371 A1 * | 12/2007 | Lea | 370/334 |
| 2008/0304417 A1 * | 12/2008 | Liu et al. | 370/242 |

OTHER PUBLICATIONS

Tian, "A Mac-Layer retransmission Algorithm designed for the physical-layer characteristics of clustered sensor networks", IEEE, 2006 pp. 3153-3164.*
Standard 802.15.4a-2007, IEEE, Aug. 2007, pp. 1, 135 and 136.*

* cited by examiner

*Primary Examiner* — Dmitry H Levitan
(74) *Attorney, Agent, or Firm* — Patterson Thuente Christensen Pedersen, P.A.

(57) ABSTRACT

A method, a network apparatus, and a tangible machine-medium thereof for detecting a looping network packet are provided. A receiving module receives a network packet. A memory stores a routing table comprising an address related variable, a sequence number related variable and a radius related variable. A determining module determines whether the network packet is a looping network packet by comparing the parameters of the routing table with those of the network packet. With these arrangements, the routing loop caused by transmission of the network packets can be detected using current network structures.

6 Claims, 2 Drawing Sheets

METHOD, NETWORK APPARATUS, AND TANGIBLE MACHINE-READABLE MEDIUM THEREOF FOR DETECTING A LOOPING NETWORK PACKET

This application claims the benefit of priority based on Taiwan Patent Application No. 096120588 filed on Jun. 7, 2007, the disclosures of which are incorporated herein by reference in their entirety.

CROSS-REFERENCES TO RELATED APPLICATIONS

Not applicable.

BACKGROUND OF THE INVENTION

1. Field of the Invention

The present invention relates to a method, a network apparatus, and a tangible machine-readable medium thereof for detecting a looping network packet; more particularly, the present invention relates to a method, a network apparatus, and a tangible machine-medium thereof for detecting a looping network packet by comparing related parameters of a routing table with related parameters of a network packet.

2. Descriptions of the Related Art

When network packets are sent in the network, some errors may occur. For example, if the routing technique is used to determine the routing path of a network packet, the network packets may end up being sent back and forth among several fixed routing nodes instead of being sent to the correct destination nodes. This condition is known as a routing loop. Routing loops may occur in general network structures, especially those employing two routing techniques at the same time, such as the Zigbee wireless network, which is defined based-on the IEEE 802.15.4 standard.

The network layer of the Zigbee wireless network provides two routing techniques. The first one is table routing, while the other one is hierarchical routing. These two routing techniques will not generate routing loops if they are used separately. Nevertheless, the Zigbee wireless network allows the two routing techniques to coexist and operate at the same time. With this algorithm, the routing link of the same network packets may be determined by different routing techniques of different nodes. Thus, the network packets could possibly form a routing loop while they are sent.

Because the network protocols currently do not define the conditions under which routing loops occur, the detection of the routing loop can only be made after the actual establishment and measurement of the network. Thus, it is important to find a method for detecting the routing loop of the network packets when they are sent, without modifying the current network structures.

SUMMARY OF THE INVENTION

The primary objective of this invention is to provide a method for detecting a looping network packet. The method comprises the following steps of: receiving a network packet; determining that an address related parameter, a sequence number related parameter, and a radius related parameter of a routing table have been replaced within a predetermined period of time; determining that an address related parameter of the routing table is the same as an address related parameter of the network packet; determining that a sequence number related parameter of the routing table is the same as a sequence number related parameter of the network packet; and determining that a radius related parameter of the routing table is different from a radius related parameter of the network packet. By having the steps, it is able to identify the network packet as a looping network packet.

The method for detecting a looping network packet described above may further comprise the steps of: (1) determining that the address related parameter of the routing table is different from the address related parameter of the network packet and/or (2) determining that the address related parameter of the routing table is the same as the address related parameter of the network packet and (3) determining that the sequence number related parameter of the network packet is greater than the address related parameter of the routing table. By having the steps, it is able to identify that the network packet is not a looping network packet. When the network packet is not a looping network packet, the address related parameter, the sequence number related parameter, and the radius related parameter of the routing table are respectively replaced by the address related parameter, the sequence number related parameter, and the radius related parameter of the network packet.

Another objective of this invention is to provide a network apparatus. The network apparatus comprises a receiving module, a memory, and a determining module. The receiving module is configured for receiving a network packet. The memory is configured for storing a routing table with the extra information, wherein the extra information comprises an address related parameter, a sequence number related parameter, and a radius related parameter. The determining module is configured for determining that an address related parameter, a sequence number related parameter, and a radius related parameter of the routing table have been replaced within a predetermined period of time, for determining that the address related parameter of the routing table is the same as an address related parameter of the network packet, for determining that the sequence number related parameter of the routing table is the same as a sequence number related parameter of the network packet, and for determine that the radius related parameter of the routing table is different from a radius related parameter of the network packet. By having the arrangement, it is able to identify the network packet as a looping network packet.

The network apparatus described above may further comprise a processor. The determining module is also configured for (1) determining that the address related parameter of the routing table is different from the address related parameter of the network packet and/or (2) determining that the address related parameter of the routing table is the same as the address related parameter of the network packet and (3) determining that the sequence number related parameter of the network packet is greater than the sequence number related parameter of the routing table. By having the arrangement, it is able to identify that the network packet is not a looping network packet. When the network packet is not a looping network packet, the processor respectively replaces the address related parameter, the sequence number related parameter, and the radius related parameter of the routing table with the address related parameter, the sequence number related parameter, and the radius related parameter of the network packet.

Yet a further objective of this invention is to provide a tangible machine-medium that stores a computer program with a code for the network apparatus to execute a method for detecting a looping network packet. The method comprises the following steps of: receiving a network packet; determining that an address related parameter, a sequence number related parameter, and a radius related parameter of a routing table have been replaced within a predetermined period of time; determining that an address related parameter of the routing table is the same as an address related parameter of the network packet; determining that a sequence number related parameter of the routing table is the same as a sequence number related parameter of the network packet; and determining that a radius related parameter of the routing table is different from a radius related parameter of the network packet. If so, the network packet is identified as a looping network packet.

The method executed by the computer program stored in the computer readable medium described above may further comprise the steps of: (1) determining that the address related parameter of the routing table is smaller then the address related parameter of the network packet and/or (2) determining that the address related parameter of the routing table is the same as the address related parameter of the network packet and (3) determining that the sequence number related parameter of the network packet is greater than the address-related parameter of the routing table. By having the steps, it is able to identify the network packet as not a looping packet. When the network packet is not a looping network packet, the address related parameter, the sequence number related parameter, and the radius related parameter of the routing table are respectively replaced by the address related parameter, the sequence number related parameter, and the radius related parameter of the network packet.

The ability of the network apparatus described above to transfer network packets is irrelevant to the present invention. To be more precisely, the objective of the present invention is to identify whether the network packet is a looping network packet or not by determining that related parameters of the router are the same as related parameters of the network packet. Furthermore, the present invention can detect the occurrence of a routing loop without having to modify the current network structures.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
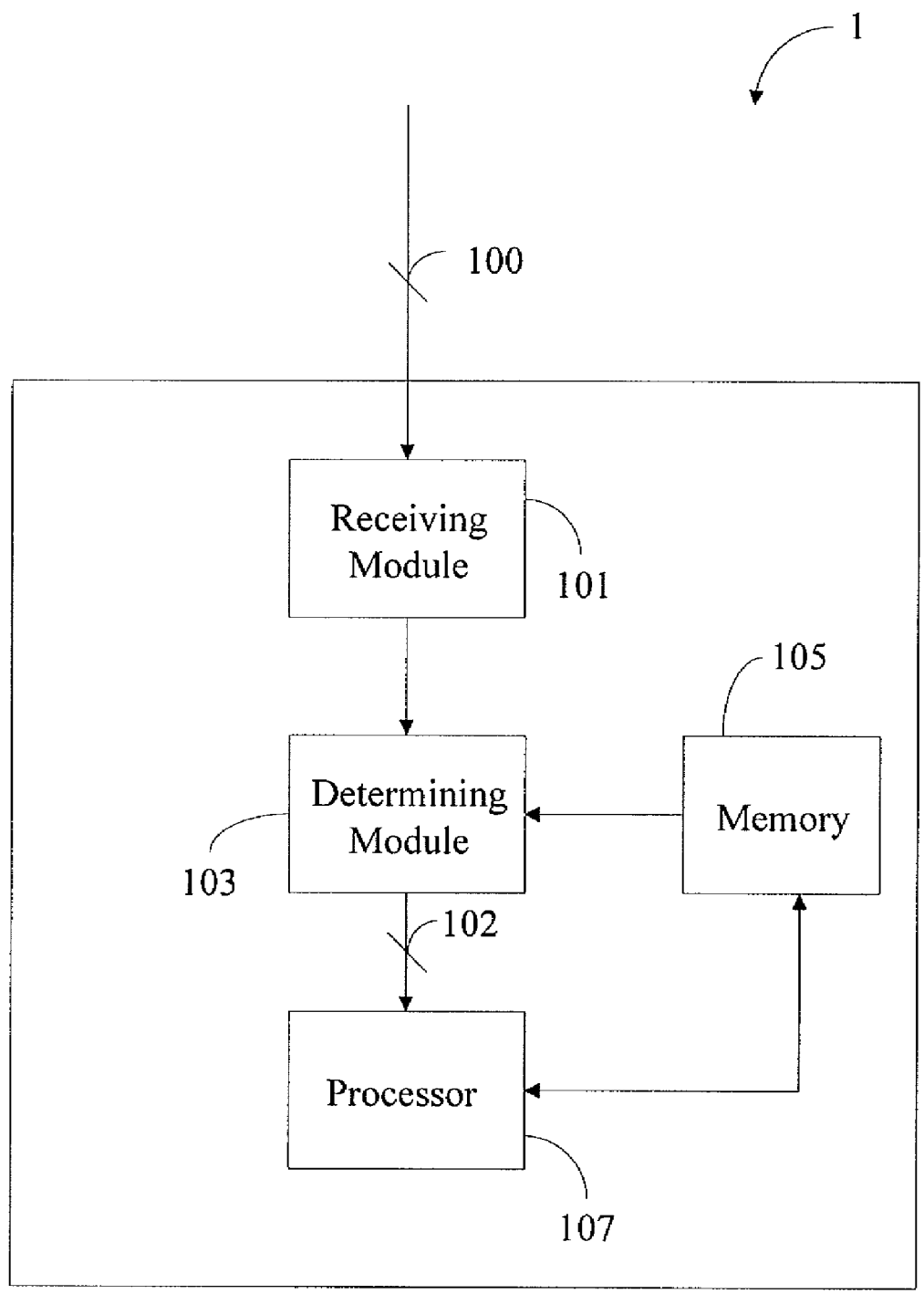
FIG. 1 is a representative diagram illustrating a first embodiment of the present invention.

As shown in FIG. 1, a first embodiment of the present invention is a network apparatus 1. The network apparatus 1 can be applied in wireless networks, such as ZigBee, Wi-Fi, or WiMax, etc. The network apparatus 1 comprises a receiving module 101, a determining module 103, a memory 105, and a processor 107. The receiving module 101 receives a network packet and then retrieves an address related parameter, a sequence number related parameter, and a radius related parameter of the network packet. More specifically, the address related parameter can be an originator address of the network packet 100, the sequence number related parameter can be a sequence number of the network packet 100, and the radius related parameter can be a radius of the network packet 100. The memory 105 stores a routing table (not shown) that records an address related parameter, a sequence number related parameter, and a radius related parameter.

Before the determining module 103 uses the address related parameters, sequence number related parameters, and radius related parameters of the network packet 100 as well as those stored in the routing table to determine the network packet as a looping network packet, the determining module 103 determines whether the address related parameter, the sequence number related parameter, and the radius related parameter of the routing table have not been replaced for a predetermined period of time. If the address related parameter, sequence number related parameter, and radius related parameter of the routing table have not been replaced for a predetermined period of time, the processor 107 replaces the address related parameter, sequence number related parameter, and radius related parameter of the routing table with a predetermined address related parameter, a predetermined sequence number related parameter, and a predetermined radius related parameter. The predetermined address related parameter can be 0xFFFF or be other suitable values to match the different network structures. The sequence number related parameter and the radius related parameter can also be replaced with other suitable values to match different network structures. If the determining module 103 determines that the address related parameter, sequence number related parameter, and radius related parameter of the routing table have been replaced within the predetermined period of time, then replacements are not required.

The determining module 103 determines whether the address related parameters, sequence related parameters, and/or radius related parameters of the routing table are respectively equal to the address related parameters, sequence related parameters, and/or radius related parameters of the network packet to determine its subsequent course.

To be more specific, if the address related parameters and sequence related parameters of the network packet 100 and those of the routing table are the same and the radius related parameters of the two are different, the determining module identifies the network packet 100 as a looping network packet. This is when a routing loop occurs.

If the address related parameter of the routing table is smaller than the address related parameter of the network packet 100, the determining module 103 identifies the network packet as not being a looping network packet. In response to this determination, the determining module 103 sends a replacing signal 102 to the processor 107. The processor 107 replaces the address related parameter, sequence number related parameter, and radius related parameter of the routing table stored in the memory 105 with the address related parameter, sequence number related parameter, and radius related parameter of the network packet 100, respectively. After the replacement, the receiving module 101 waits for a next network packet to detect if the next network packet is looping. If the address related parameter of the routing table is greater than the address related parameter of the network packet 100, the determining module 103 also identifies the network packet as not being a looping network packet, and the receiving module 101 waits for the next network packet.

If the address related parameter of a routing table is the same as the address related parameter of the network packet 100, the determining module 103 further determines whether the sequence number related parameter of the network packet 100 is greater than the sequence related parameter of the routing table. If the sequence number related parameter of the network packet 100 is greater than the sequence related parameter of the routing table, the determining module 103 also sends a replacing signal 102 to the processor 107. The processor 107 replaces the address related parameter, sequence number related parameter, and radius related parameter of the routing table stored in the memory 105 with the address related parameter, sequence number related parameter, and radius related parameter of the network packet 100. If the sequence number related parameter of the network packet 100 is smaller than the sequence related parameter of the routing table, the network apparatus 1 does nothing and continues to wait for the next network packet to detect if the network packet is looping.

As illustrated by the first embodiment, the network apparatus 1 can detect a looping network packet and further process the network packet so that the network packet can be sent to its destination. Thus, the efficiency of the network is improved.

Figure 2:
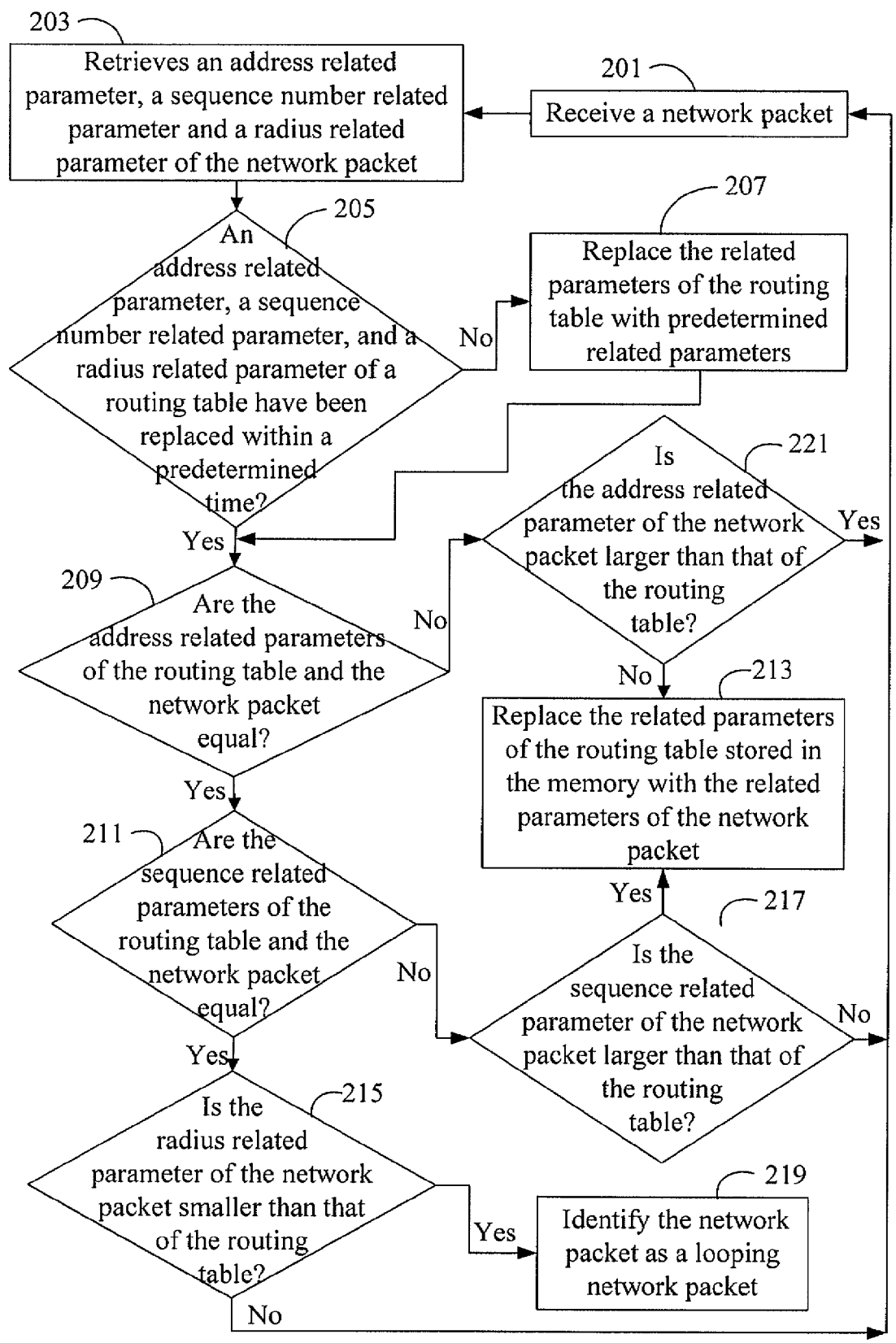
FIG. 2 is a flow chart illustrating a second embodiment of the present invention.

A second embodiment is a method for detecting a looping network packet. The method is applied to the network apparatus 1 as described in the first embodiment. More specifically, the method for detecting a looping network packet in the second embodiment is implemented by using a computer program to control the modules in the apparatus 1. The flow chart is shown in FIG. 2. The computer program can be stored in a tangible machine-medium such as an ROM, a flash memory, a floppy disc, a hard disc, an optical disc, a flash disc, a tape, a database accessible from a network, or a storage medium with the same functionality that can be easily thought by people skilled in this field.

Step 201 is first executed, in which the computer program comprises the code for enabling the receiving module 101 to receive a network packet. Then, step 203 is executed, in which the computer program comprises the code for enabling the receiving module 101 to retrieve an address related parameter, sequence number related parameter and radius related parameter of the network packet. Then, step 205 is executed, in which the computer program comprises the code for controlling the processor 107 to determine whether the address related parameter, sequence number related parameter, and radius related parameter of the routing table have been replaced within a predetermined period of time. If the address related parameter, sequence number related parameter, and radius related parameter of the routing table have not been replaced within the predetermined period of time, step 207 is executed, in which the computer program comprises the code for enabling the processor 107 to replace the address related parameter, sequence number related parameter, and radius related parameter of the routing table with a predetermined address related parameter, a predetermined sequence number related parameter, and a predetermined radius related parameter. Then, step 209 is executed, in which the computer program comprises the code for enabling the determining module 103 to determine if the address related parameters of the routing table and the network packet are equal. If in step 205 the address related parameter, sequence number related parameter, and radius related parameter of the routing table have been replaced within the predetermined period of time, then step 209 is directly executed.

If in step 209, the address related parameters of the routing table and the network packet are equal, step 211 is executed, in which the computer program comprises the code for enabling the determining module 103 to continue determining whether the sequence related parameters of the routing table and network packet are equal. If step 209 determines that the address related parameters of the routing table and the network packet are not equal, step 221 is executed, in which the computer program comprises the code for enabling the determining module 103 to continue determining whether the address related parameter of the network packet is larger than the address related parameter of the routing table. If step 221 determines that the address related parameter of the network packet is not larger than the address related parameter of the routing table, step 213 is executed, in which the computer program comprises the code for enabling the processor 107 to replace the address related parameter, sequence number related parameter, and radius related parameter of the routing table stored in the memory 105 with the address related parameter, sequence number related parameter, and radius related parameter of the network packet 100. If step 221 determines that the address related parameter of the network packet is larger than the address related parameter of the routing table, step 201 is executed, in which the computer program comprises the code for enabling the receiving module 101 to receive the next network packet.

If step 211 determines that the sequence related parameters of the routing table and the network packet are equal, then step 215 is executed, in which the computer program comprises the code for enabling the determining module 103 to determine whether the radius related parameter of the network packet is smaller than the radius related parameter of the routing table. If in step 211, the sequence related parameters of the routing table and the network packet are not equal, step 217 is executed, in which the computer program comprises the code for enabling the determining module 103 to determine whether the sequence related parameter of the network packet is larger than the sequence related parameter of the routing table.

If in step 215, the radius related parameter of network packet is smaller than the radius related parameter of the routing table, step 219 is executed to identify the network packet as a looping network packet. If in step 215, the radius related parameter of network packet is not smaller than the radius related parameter of the routing table, step 201 is executed in which the computer program comprises the code for enabling the receiving module 101 to wait for the next network packet.

If in step 217 the sequence related parameters of the network packet is greater than the sequence related parameters of the routing table, step 213 is executed, in which the computer program comprises the code for enabling the processor 107 to replace the address related parameter, sequence number related parameter, and radius related parameter of the routing table with the address related parameter, sequence number related parameter, and radius related parameter of the network packet. If in step 217 the sequence related parameters of the network packet is smaller than the sequence related parameters of the routing table, step 201 is executed, in which the computer program comprises the code for enabling the receiving module 101 to receive the next network packet.

In addition to the steps described above, the second embodiment can also execute the operations and functions described in the first embodiment. People skilled in this field can directly understand how the second embodiment executes these operations and functions based on the first embodiment described above. Thus, the detail is not described here.

Accordingly, the present invention can determine each condition of the different parameters by comparing between the related parameters of the routing table and the corresponding related parameters of the network packet. As a result, the network packet can either be determined to be a looping network packet or not. Thus, possible routing loops that may occur in the transmission of a network packet can be detected without having to modify any current network structure used today.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A method for detecting a looping network packet, comprising the steps of:
    receiving a network packet;
    determining that an address related parameter, a sequence number related parameter, and a radius related parameter of a routing table have been replaced within a predetermined period of time, wherein the radius related parameter indicates a number of counts the network packet has been forwarded in hops;
    determining that the address related parameter of the routing table is the same as an address related parameter of the network packet;
    determining that the sequence number related parameter of the routing table is the same as a sequence number related parameter of the network packet; and
    determining that the radius related parameter of the routing table is different from a radius related parameter of the network packet, in order to identify the network packet as the looping network packet.

2. A network apparatus, comprising:
    a receiving module for receiving a network packet;
    a memory for storing a routing table with extra information, wherein the extra information comprises an address related parameter, a sequence number related parameter, and a radius related parameter, wherein the radius related parameter indicates a number of counts the network packet has been forwarded in hops; and
    a determining module for determining that the address related parameter, the sequence number related parameter, and the radius related parameter of the routing table have been replaced within a predetermined period of time, for determining that the address related parameter of the routing table is the same as an address related parameter of the network packet, for determining that the sequence number related parameter of the routing table is the same as a sequence number related parameter of the network packet, and for determining that the radius related parameter of the routing table is different from a radius related parameter of the network packet, in order to identify the network packet as a looping network packet.

3. The network apparatus as claimed in claim 2, wherein the address related parameter of the network packet is an originator address of the network packet.

4. The network apparatus as claimed in claim 2, wherein the sequence number related parameter of the network packet is a sequence number of the network packet.

5. The network apparatus as claimed in claim 2, wherein the radius related parameter of the network packet is a radius of the network packet.

6. A tangible non-transitory machine-readable medium storing a computer program having code for a network apparatus to execute a method for detecting a looping network packet, the method comprising the steps of:
    determining that an address related parameter, a sequence number related parameter, and a radius related parameter of a routing table have been replaced within a predetermined period of time, wherein the radius related parameter indicates a number of counts the network packet has been forwarded in hops;
    determining that the address related parameter of the routing table is the same as an address related parameter of the network packet;
    determining that the sequence number related parameter of the routing table is the same as a sequence number related parameter of the network packet; and
    determining that the radius related parameter of the routing table is different from a radius related parameter of the network packet, in order to identify the network packet as the looping network packet.

* * * * *